(12) United States Patent
Sivapragasam et al.

(10) Patent No.: US 7,769,727 B2
(45) Date of Patent: Aug. 3, 2010

(54) RESOLVING UPDATE-DELETE CONFLICTS

(75) Inventors: Muhunthan Sivapragasam, Kirkland, WA (US); Don Cao, Issaquah, WA (US); Irena Hudis, Bellevue, WA (US); Lev Novik, Bellevue, WA (US); Tomas Talius, Sammamish, WA (US); Vivek J. Jhaveri, Seattle, WA (US); Yunxin Wu, Kirkland, WA (US); Ann Tang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 784 days.

(21) Appl. No.: 11/444,180

(22) Filed: May 31, 2006

(65) Prior Publication Data

US 2007/0282914 A1 Dec. 6, 2007

(51) Int. Cl.
G06F 7/00 (2006.01)
G06F 15/16 (2006.01)
H04W 4/00 (2009.01)
(52) U.S. Cl. .................. 707/690; 455/462; 709/248
(58) Field of Classification Search .............. None
See application file for complete search history.

(56) References Cited

U.S. PATENT DOCUMENTS

| 5,485,607 | A | 1/1996 | Lomet et al. ............. 395/600 |
| 5,710,922 | A | 1/1998 | Alley et al. ............. 395/617 |
| 5,806,075 | A | 9/1998 | Jain et al. ............. 707/201 |
| 6,065,017 | A * | 5/2000 | Barker ............. 707/202 |
| 6,363,387 | B1 | 3/2002 | Ponnekanti et al. ............. 707/10 |
| 6,604,102 | B2 | 8/2003 | Klein et al. ............. 707/4 |
| 6,681,226 | B2 | 1/2004 | Bretl et al. ............. 707/8 |
| 7,000,234 | B1 | 2/2006 | Shavit et al. ............. 719/315 |
| 7,024,430 | B1 | 4/2006 | Ingraham et al. ............. 707/201 |
| 7,483,915 | B2 * | 1/2009 | Thompson et al. ............. 707/103 R |
| 7,483,923 | B2 * | 1/2009 | Novik ............. 707/201 |
| 2002/0032883 | A1 * | 3/2002 | Kampe et al. ............. 714/16 |
| 2004/0024795 | A1 | 2/2004 | Hind et al. ............. 707/204 |
| 2004/0249870 | A1 * | 12/2004 | Jeevanjee et al. ............. 707/204 |
| 2005/0044108 | A1 * | 2/2005 | Shah et al. ............. 707/104.1 |
| 2005/0044187 | A1 * | 2/2005 | Jhaveri et al. ............. 709/219 |

(Continued)

OTHER PUBLICATIONS

Stephane Gancarski, Hubert Naacke, Esther Pacitti and Patrick Valduriez, "Parallel Processing with Autonomous Databases in a Cluster System", Sep. 11, 2002.*

(Continued)

*Primary Examiner*—Neveen Abel Jalil
*Assistant Examiner*—Tarek Chbouki
(74) *Attorney, Agent, or Firm*—Woodcock Washburn LLP

(57) ABSTRACT

Update-delete conflicts detected during synchronization can be resolved in favor of the update or the deletion. Resolving the conflict in favor of the deletion results in the entity deleted on one replica being deleted on all selected replicas. Resolving the conflict in favor of the update results in the updated entity, which includes an entity moved from one hierarchy to another, being replicated on all selected replicas. To resolve the conflict in favor of the update, the deletion is treated as though it were reported erroneously. The deleted entity is resurrected in the form of the updated entity. Change version information is maintained in all replicas. Update-delete conflicts are resolvable in accordance with various resolution policies such as the update wins, deletion wins, changes occurring on a particular device wins, and most recent event wins, for example.

16 Claims, 16 Drawing Sheets

U.S. PATENT DOCUMENTS

| | | | |
|---|---|---|---|
| 2005/0050054 A1* | 3/2005 | Clark et al. | 707/100 |
| 2005/0050073 A1* | 3/2005 | Demiroski et al. | 707/100 |
| 2005/0050537 A1* | 3/2005 | Thompson et al. | 717/165 |
| 2005/0055380 A1* | 3/2005 | Thompson et al. | 707/200 |
| 2005/0125621 A1* | 6/2005 | Shah | 711/173 |
| 2005/0171960 A1 | 8/2005 | Lomet | 707/100 |
| 2005/0223047 A1* | 10/2005 | Shah et al. | 707/201 |
| 2005/0256907 A1* | 11/2005 | Novik et al. | 707/200 |
| 2006/0106879 A1* | 5/2006 | Zondervan et al. | 707/200 |
| 2006/0200533 A1* | 9/2006 | Holenstein et al. | 709/208 |
| 2007/0088725 A1* | 4/2007 | Demiroski et al. | 707/100 |

OTHER PUBLICATIONS

Oracle, "Oracle Database Lite", Jun. 29, 2004.*

"Interface SyncResolver", Java™ 2 Platform Standard Ed. 5.0, http://java.sun.com/j2se/1.5.0/docs/api/javax/sql/rowset/spi/SyncResolver.html, Apr. 11, 2006, 10 pages.

Lam, F. et al., "Efficient Synchronization for Mobile XML Data", *CIKM*, 2002, http://delivery.acm.org, 153-160.

Manber, U. et al., "Concurrency Control in a Dynamic Search Structure", *ACM Transactions on Database Systems*, Sep. 1984, 9(3), 439-455.

* cited by examiner

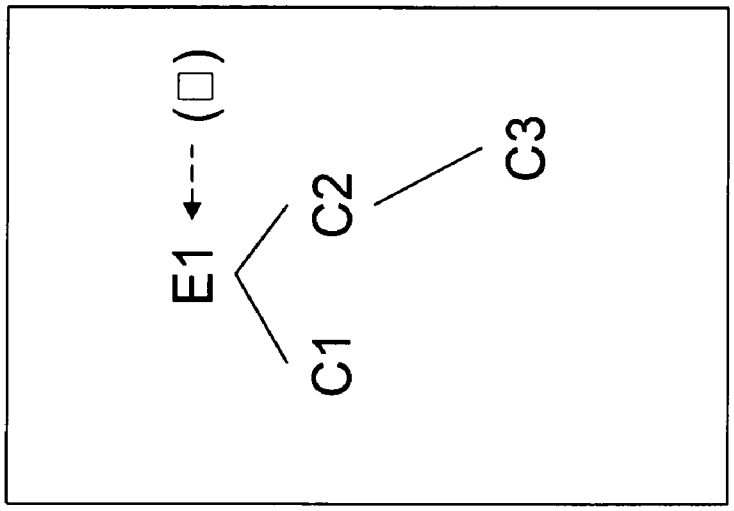
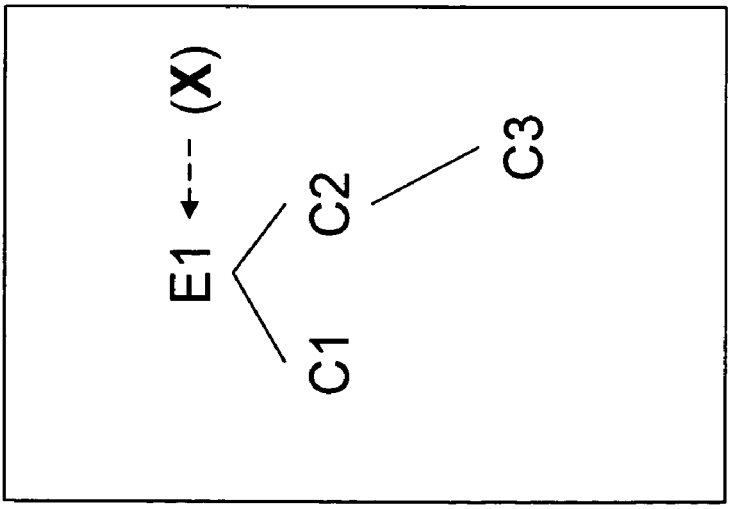
FIGURE 1

| Scenario | Resolution Type | | | |
|---|---|---|---|---|
| | Local Wins | Remote Wins | Update Wins | Delete Wins |
| Replica A deletes entity E1 while replica B updates E1. A → B | E1 remains with no data changes, other than the update. | E1 is deleted. | Same as local wins. | Same as remote wins. |
| B → A | E1 is deleted. | E1 is marked for resurrection and are resurrected upon convergence. | Same as remote wins. | Same as local wins. |

FIGURE 2

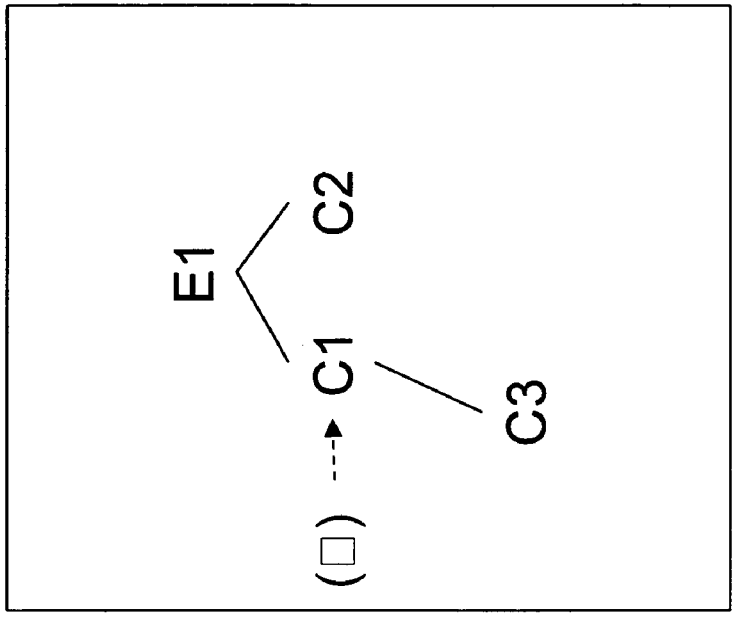
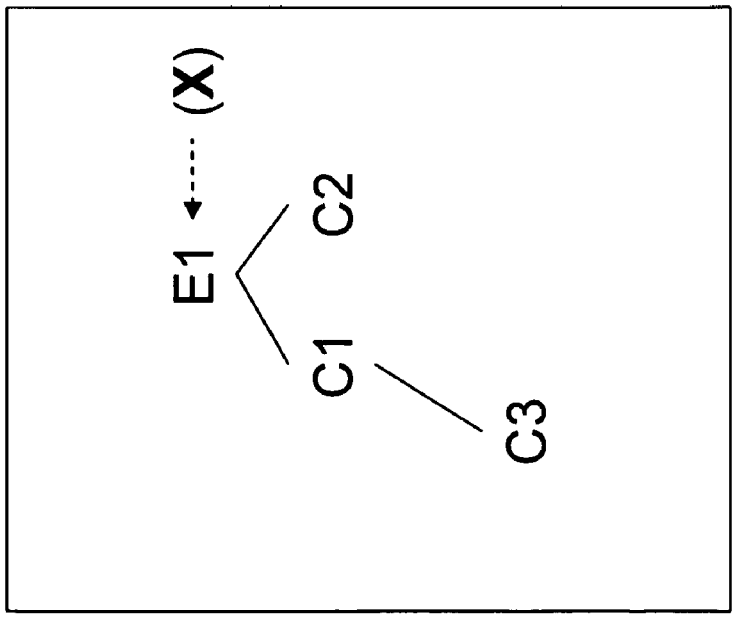
FIGURE 3

| Scenario | Resolution Type | | | |
|---|---|---|---|---|
| | Local Wins | Remote Wins | Update Wins | Delete Wins |
| Replica A deletes E1 while replica B updates one of its child entities C1<br>A → B | E1 and all the entities in the hierarchy below E1 remain with no changes (other than the update to C1). | E1 and all its children (all entities in the hierarchy below E1), are deleted. | Same as local wins | Same as remote wins |
| B → A | E1 and all its children (all entities in the hierarchy below E1), are deleted. | E1 and all entities in the hierarchy below it are marked for resurrection and are resurrected upon convergence. | Same as remote wins | Same as local wins |

FIGURE 4

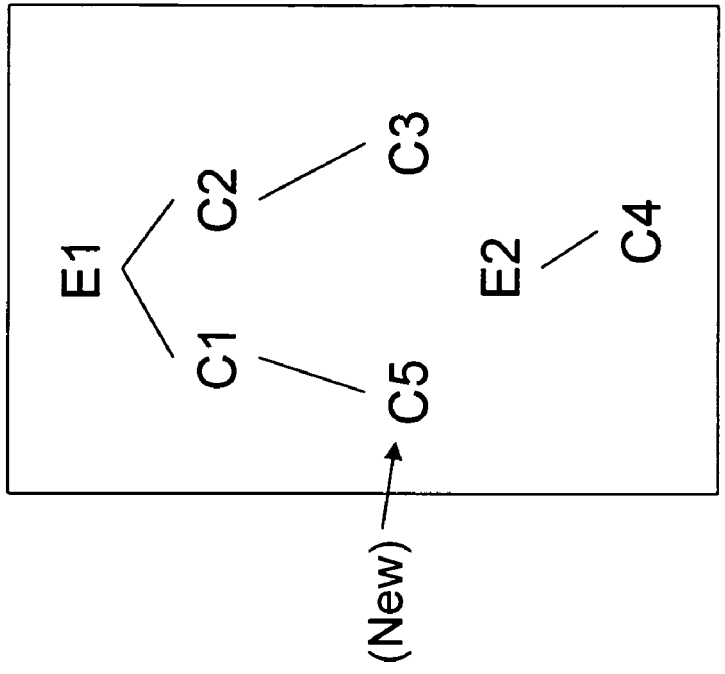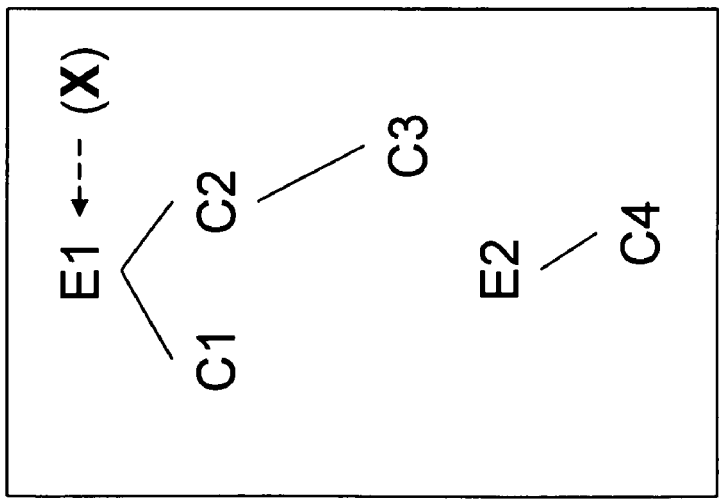
FIGURE 5

| Scenario | Resolution Type | | | |
|---|---|---|---|---|
| | Local Wins | Remote Wins | Update Wins | Delete Wins |
| Replica A deletes E1 while replica B adds a new entity C5 to the same compound item in the hierarchy below E1.<br>A ➔ B | E1 and all the entities in the hierarchy below E1 remain with no changes (other than the addition of C5). | E1 and all its children (all entities in the hierarchy below E1), are deleted. | Same as local wins | Same as remote wins |
| B ➔ A | E1 and all its children (all entities in the hierarchy below E1), are deleted. | E1 and all entities in the hierarchy below it are marked for resurrection and are resurrected upon convergence, and C5 is added. | Same as remote wins | Same as local wins |

FIGURE 6

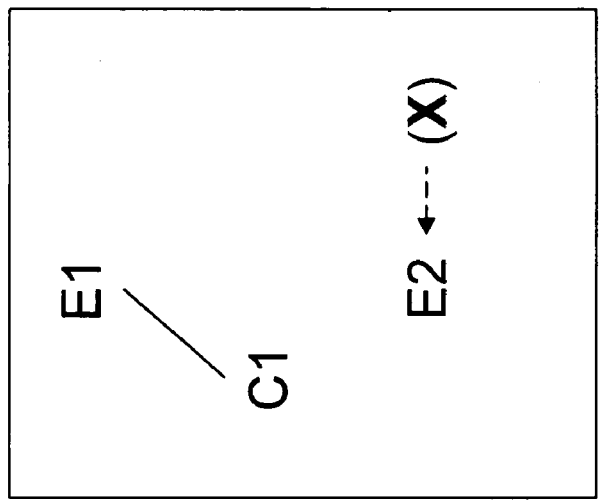
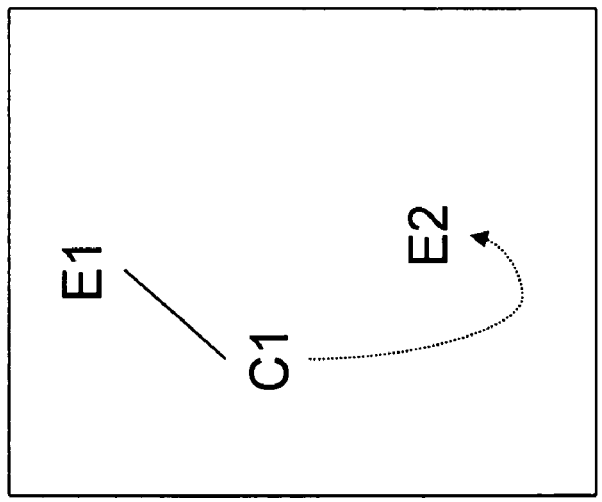
FIGURE 7

| Scenario | Immediate | Converged |
|---|---|---|
| Replica A and replica B have compound item E1, which contains child entity C1.<br><br>Replica A moves C1 to E2's hierarchy, while replica B deletes E2.<br><br>A → B | C1 exists under E1.<br>E2 is deleted. | E1 is alive.<br>E2 is deleted.<br>C1 exists under E1. |
| B → A | E2 is resurrected.<br>C1 exists under E2. | E1 and E2 are alive<br>C1 exists under E2. |

FIGURE 8

|   | Replica A | | Replica B | | Replica C |
|---|---|---|---|---|---|
| 1 | A10, B15, C20 | | A10, B15, C20 | | A10, B15, C20 |
| 2 | A10, B15, C20<br>CU:A11 | A→B | A10, B15, C20<br>DV:B16 | | A10, B15, C20 |
| 3 | A10, B15, C20<br>CU:A11 | A←B | A11, B17*, C20<br>B17:(BOV:B16) | | A10, B15, C20 |
| 4 | A12, B17, C20<br>A12(BOV:A11)<br>B17:(BOV:B16) | A→B | A12, B17*, C20<br>A12(BOV:A11)<br>B17:(BOV:B16) | | A10, B15, C20 |
| 5 | A12, B17, C20<br>A12(BOV:A11)<br>B17:(BOV:B16) | | A12, B17, C20<br>A12(BOV:A11)<br>B17:(BOV:B16) | | A10, B15, C20 |
| 6 | A12, B17, C20<br>A12(BOV:A11)<br>B17:(BOV:B16) | | A12, B17, C20<br>A12(BOV:A11)<br>B17:(BOV:B16) | B→C | A12, B17, C20<br>A12(BOV:A11)<br>B17:(BOV:B16) |

FIGURE 9

RESOLVING UPDATE-DELETE CONFLICTS

TECHNICAL FIELD

The technical field generally is related to information storage and retrieval and more specifically to handling synchronization conflicts.

BACKGROUND

Synchronization solutions for distributed computing environments often deal with changes that occur on different computers. An update-delete conflict refers to a conflict arising, such as, during the synchronization of two devices, in which an entity is deleted on one device and the entity is updated on another device. For example, while away from the office, a user could delete on her personal digital assistant (PDA), a scheduled meeting, and the user's secretary could, on the user's desk top computer, add items to the agenda of the meeting. When the user returns to the office and synchronizes her PDA with her desktop, an update-delete conflict arises. Current attempted synchronization solutions include resolving the conflict in favor of the deletion. That is, the entity is deleted on both devices. Another solution treats the deletion as final and never detects or reports the conflict. Yet another attempted solution is to recreate a new entity which leads to problems such as duplicate entities.

An object of a typical synchronization system is to have all replicas converge to consistent versions. Convergence can be problematic when resolving update-delete conflicts. For example, in a distributed system having many devices, it is possible for one device to delete an entity and other devices to make independent changes to the entity. Current synchronization systems do not track the independent changes and ensure that all devices, including the device on which the entity was deleted, consistently converge.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

An update-delete conflict between an entity in one replica and the entity in another replica can be resolved in favor of either the update or the deletion. Resolving the conflict in favor of the deletion results in deleting the entity in both replicas. Resolving a conflict leads to all replicas in the community picking up the resolution. A synchronization (sync) community includes all replicas that exchange changes. When the conflict is resolved in favor of the update, the deletion is treated as though it were erroneous. When the conflict is resolved in favor of the update, the deleted entity is resurrected. Resurrecting an entity comprises recreating the deleted entity. For example, when an entity is deleted on a first device (deleter) and updated on a second device (updater), during synchronization, the updater receives notification (referred to as a tombstone) that the entity has been deleted. If the conflict resolution policy favors the update, the updater recreates a copy of the entity and sends the copy along with additional information to aid the deleter in resurrecting the entity. The deleter updates the deleted entity based on the version of the entity provided by the updater, which is the version of the entity prior to deletion. In order for the entities in all replicas to converge to the same version, information pertaining to previous changes on which a current change is based, and a flag marking an entity for resurrection, is provided. Update-delete conflicts are resolvable in accordance with various resolution policies such as the update always winning, the deletion always winning, changes occurring on a particular device always winning, and the most recent event winning, for example.

BRIEF DESCRIPTION OF THE DRAWINGS

The foregoing summary, as well as the following detailed description, is better understood when read in conjunction with the appended drawings. For the purpose of illustrating resolution of update-delete conflicts, there is shown in the drawings exemplary constructions thereof, however, resolving update-delete conflicts is not limited to the specific methods and instrumentalities disclosed.

FIG. 1 depicts an example update-delete conflict between two replicas.

FIG. 2 depicts various example conflict resolutions for the scenario depicted in FIG. 1.

FIG. 3 depicts another example update-delete conflict between two replicas.

FIG. 4 depicts various example conflict resolutions for the scenario depicted in FIG. 3.

FIG. 5 depicts yet another example update-delete conflict between two replicas.

FIG. 6 depicts various example conflict resolutions for the scenario depicted in FIG. 5.

FIG. 7 depicts still another update-delete conflict between two replicas.

FIG. 8 depicts various example conflict resolutions for the scenario depicted in FIG. 7.

FIG. 9 illustrates an example resolution of an update-delete conflict involving three replicas.

DETAILED DESCRIPTION OF ILLUSTRATIVE EMBODIMENTS

Figure 10:
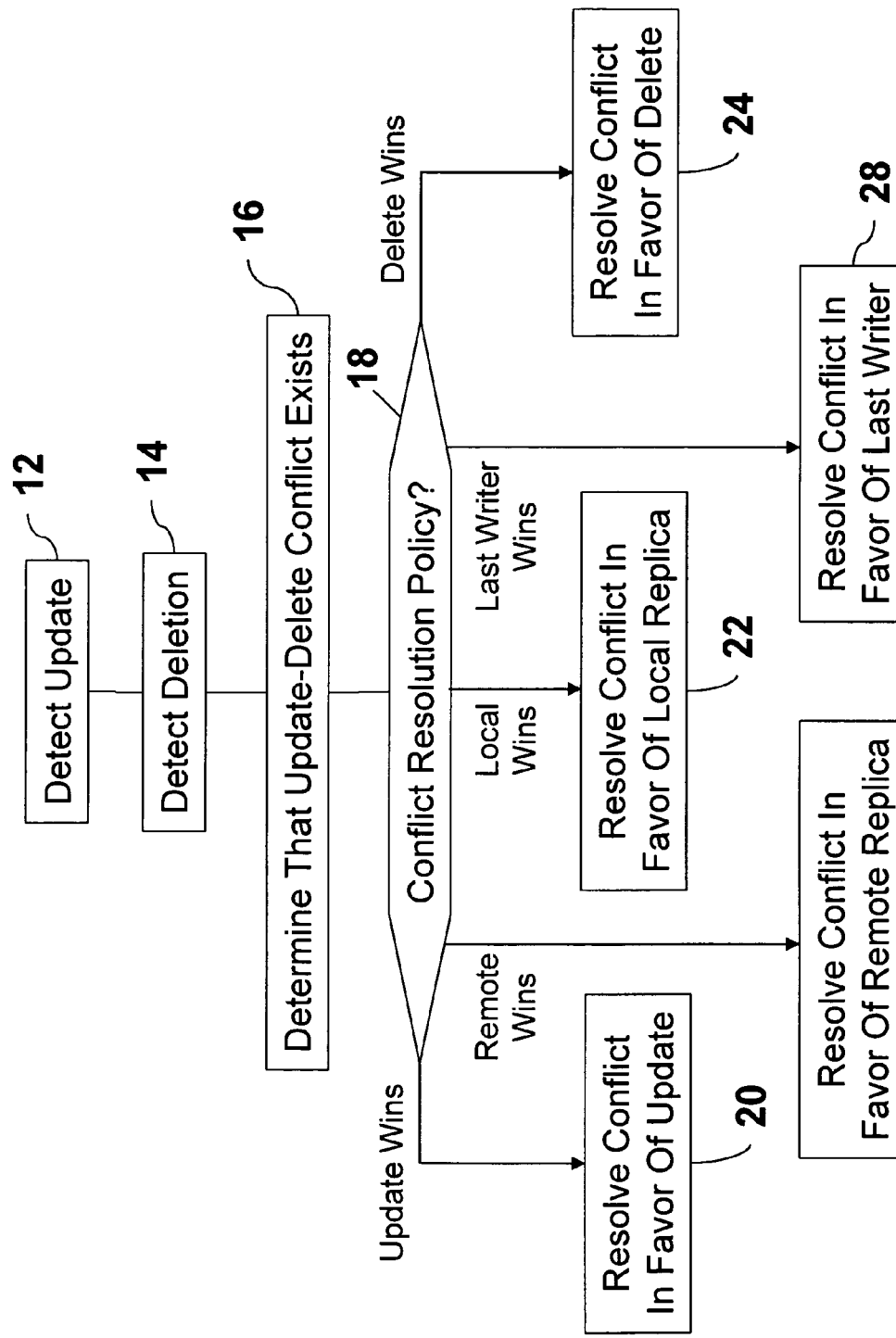
FIG. 10 is a flow diagram of an example process for resolving update-delete conflicts.

Synchronization is the process of maintaining two or more data stores to be identical under some series of changes. For example, it is not uncommon for a user to possess more than one computing device. A user can have a desktop computer, a server and/or a laptop computer for work or home use. The user also could have a portable device, such as a palm-top computer, a personal digital assistant (PDA), a pocket PCs, a mobile phone, or the like. Typically data is copied to and between multiple devices. Often, when data is modified in one device, synchronization is required to update the other devices. This typically involves synchronization.

Synchronization occurs between replicas. Replicas can reside on one or multiple devices. A replica can comprise, for example, a copy of a contact in an address book, a file in a file directory, a folder in a file directory, or the like. More specifically, a replica comprises at least one unit of storable information referred to as an entity. In the WINDOWS® operating system, for example, entities are accessible to an operating system and have a basic set of properties that are commonly supported across all objects exposed to an end-user or application. In a relational file system for WINDOWS®, such as WinFS (WINDOWS® Future Storage) for example, an entity can comprise an item or a fragment. In WinFS parlance, an item is a data unit stored in a WinFS store and a fragment is a portion of an item.

A change unit is the smallest portion of an entity that is tracked during synchronization. To illustrate the concept of entities and change units, an example scenario is provided. Consider a document, such as a MICROSOFT WORD® document. The document could comprise entities in the form of paragraphs. That is, an entity could be defined as a paragraph. A change unit could be defined as a sentence. Thus, in this example, the smallest unit that would be tracked during synchronization would be a sentence. Each time a change is made to a change unit, such as a sentence in the previous example, the change is assigned a new change unit version number. Version numbers are assigned in monotonically increasing order to avoid duplicate numbering. Each time a change is made to a change unit, notification of the change, including the change unit version, is sent to all replicas to ensure consistent convergence between all replicas.

Different replicas can make changes independently. Synchronization involves making every replica aware of the changes made by other replicas. Synchronization ensures that designated replicas converge to consistent versions. During synchronization, conflicts can be detected and resolved. One type of conflict, referred to herein as an update-delete conflict, occurs when a portion of a replica, on one device has been deleted and the same portion, on another device has been updated. Note that deletion of a whole replica implies removing a device from the synchronization community, it is an irrevocable action and does not lead to conflicts. As described in more detail below, updating a portion of a replica can include moving the portion of the replica.

Various types of update-delete conflicts can arise. For example, in one scenario, a replica, e.g., replica A, can delete an entity residing in replica A (referred to as entity A for the sake of discussion), and another replica, e.g., replica B, can update the same entity residing in replica B (referred to as entity B for the sake of discussion). In another scenario, replica A can delete entity A and replica B can update one of entity B's children. Note, that entity B's children are entities. In yet another scenario, replica A can delete a parent entity A and replica B can create a child entity in parent entity B's hierarchy. In still another scenario, replica A can delete entity A, and replica B can move another entity, into entity B's hierarchy.

In an example embodiment, update-delete conflicts can be resolved in favor of either the update or the deletion. When the conflict is resolved in favor of the update, the deletion is treated as if it were erroneous. Thus, during synchronization, on the deleter side (the replica in which the deletion occurred), the deleted entity is resurrected to the updated entity. When a deleted entity is resurrected, the deleted entity is recreated using the copy of the entity that was received from the other replica during synchronization. In an example embodiment, the entity is restored to the most recent version of the updated entity available. On the updater side (the replica in which the update occurred), there is a live entity.

In order to resolve an update-delete conflict in favor of the update, as described in more detail below, all change units in the entity are assigned new change unit versions based on the previous versions. The next time the deleter asks for change enumeration, the change units are sent allowing the deleted entity to be resurrected.

Partial entities, rather than full entities, are tracked. That is, as described above, a change unit, rather than the entity is tracked. Thus, there may not be enough information to resolve the conflict and resurrect a deleted entity right away. When an update-delete conflict is resolved on the deleter side, in favor of the update, a flag is provided indicating that the entity is to be resurrected. The resurrection flag is provided along with the indication (referred to as a tombstone) that the entity has been deleted. When this change is enumerated to a replica in the community, it indicates there was a deletion but the replica wants to undo it. This results in new versions being assigned to all change units associated with the deleted entity.

Conflicts can be resolved in accordance with various resolution policies such as, local wins, remote wins, update wins, deletion wins, and most recent wins. When two replicas are synchronized, one replica is considered the local replica and the other replica is considered the remote replica. In a hierarchical structure, wherein entities have children, in an example embodiment, an entity is resurrected at the highest appropriate level in the hierarchy. For example, if an entity has children and the entity is deleted (resulting in the children being deleted), the parent and its children are resurrected. In WinFS, for example, an entity is resurrected, when appropriate, at the compound item level. A compound item is a container such that the compound item and all items contained in it form a single unit of consistency. All common operations (e.g., copy, sync, backup/restore, delete, secure) operate on the compound item as a unit. The copy operation in the WinFS, for example, copies a whole compound item, not merely a portion of the compound. An example in which resurrection is accomplished at the compound item level (assuming the conflict resolution policy results in the update winning) is depicted in the scenario in which one replica deleted an entire compound item and the other replica updated one or more entities of the compound item. In this case, the entire compound item is resurrected. Further, in situations in which the delete is not to the root compound item, all entities below the deleted entity are resurrected. Because the unit of resurrection is the compound item, versions for all entities in the hierarchy are assigned a new deletion version with based on deletion version set to previous deletion version.

Update-delete conflicts are created on a per entity basis, rather than a per change unit basis. Accordingly, learned knowledge saved as part of these conflicts is indicative of the entire entity. When a tombstone marked for resurrection is received, if a live entity is present locally, all change units are assigned a new last (most recent) update version. Further, each new version will contain knowledge indicating what the new version is based on. Each change unit version will have the previous version set as based on version. The based on version is indicative of the version of the previous update to the change unit. Based on version(s) indicate that the new version is based on a conflict resolution change version given to it. When a tombstone marked for resurrection is received, if a tombstone is present locally, the local tombstone is marked for resurrection. If the deletion version is not known to the sender, the deleted version is added to the based on deletion version. If a tombstone that is marked for resurrection is present locally, a deletion version is picked deterministically and the based on version includes all original deletion versions.

Various types of update-delete conflicts can occur. For example: replica A can delete its entity E and replica B can update its entity E; replica A can delete its entity E and replica B can update one (or more) of E's child entities; replica A can delete E and replica B can create a child entity in E's hierarchy; and replica A can delete E and replica B can move another entity into E's hierarchy.

FIG. 1 depicts an example update-delete conflict between two replicas, replica A and replica B. Replica A comprises entity E1 (e.g., item, fragment, link, extension, or the like). Entity E1 comprises child entity C1 and child entity C2. Child entity C2 comprises child entity C3. Replica B comprises the same entity hierarchies as replica A. As depicted in FIG. 1, replica A has deleted entity E1 therein (as depicted by the letter "X") and replica B has updated entity E1 therein (as depicted by the check mark "√"). The resolution of this update-delete conflict is dependent upon the resolution policy.

FIG. 2 is a table depicting various example resolution results of the scenario depicted in FIG. 1. As depicted in FIG. 2, replica A sending synchronization information to replica B is depicted by an arrow pointing from A to B (A➔B). That is, A➔B indicates synchronization of changes from A to B. In FIG. 2, replica B is considered local and replica A is considered remote when A➔B. If the policy is local wins, the entity E1 remains as updated. If the resolution policy is remote wins, E1 is deleted. Also as shown in FIG. 2, if the resolution policy is update wins or delete wins, the results are the same, respectively, as local wins and remote wins. If replica B sends synchronization information to replica B (B➔A), replica A is consider local and replica B is considered remote. If the resolution policy is local wins or delete wins, E1 is deleted. If the resolution policy is remote wins or update wins, E1 is marked for resurrection utilizing the previous version as the based on version, and E1 is resurrected and updated upon convergence.

FIG. 3, depicts another example update-delete conflict between two replicas, replica A and replica B, in which replica A has deleted entity E1 (depicted by the letter "X") and replica B has updated child entity C1 (depicted by the check mark "√"). Replica A comprises entity E1. Entity E1 comprises child entity C1 and child entity C2. Child entity C1 comprises child entity C3. Replica B comprises the same entity hierarchies as replica A. The resolution of this update-delete conflict is dependent upon the resolution policy. E1, C1, and C2 are part of the same compound item. When the conflict is resolved, C2 stays alive. Only C1 was updated.

FIG. 4 is a table depicting various example resolution results of the scenario depicted FIG. 3. When replica A sends synchronization information to replica B (A➔B), replica B is local and replica A is remote. If the resolution policy is local wins, E1 and all of C1's parent entities are not deleted. There is no conflict with E1. If the resolution policy is remote wins, E1 and all entities in its hierarchy below are deleted. Also as shown in FIG. 4, if the resolution policy is update wins or delete wins, the results are the same, respectively, as local wins and remote wins. When replica B sends synchronization information to replica A (B→A), replica A is local and replica B is remote. If the resolution policy is local wins, E1 and all entities in its hierarchy below are deleted. If the resolution policy is remote wins, E1 and all of C1's parent entities are marked for resurrection and are resurrected upon convergence. Also as shown in FIG. 4, if the resolution policy is update wins or delete wins, the results are the same, respectively, as remote wins and local wins.

FIG. 5 is another example update-delete conflict between two replicas, replica A and replica B, in which replica A has deleted entity E1 (depicted by the letter "X") and replica B has created a child entity, C5 in entity C1's hierarchy. Replica A comprises entity E1 and entity E2. Entity E1 comprises child entity C1 and child entity C2. Child entity C2 comprises child entity C3. Entity E2 comprises child entity C4 in its hierarchy. Replica B comprises the same entity hierarchy as replica A, except that child entity C5 has been added to C1's hierarchy. The resolution of this update-delete conflict is dependent upon the resolution policy.

FIG. 6 is a table depicting various example resolution results of the scenario depicted FIG. 5. When replica A sends synchronization information to replica B (A➔B), replica B is local and replica A is remote. If the resolution policy is local wins, E1 and all of C1's parent entities are not deleted. There is no conflict with E1. C5 is added to the hierarchy. If the resolution policy is remote wins, E1 and all entities in its hierarchy below are deleted. Also as shown in FIG. 6, if the resolution policy is update wins or delete wins, the results are the same, respectively, as local wins and remote wins. When replica B sends synchronization information to replica A (B➔A), replica A is local and replica B is remote. If the resolution policy is local wins, E1 and all entities in its hierarchy below are deleted. If the resolution policy is remote wins, E1 and all of C1's parent entities are marked for resurrection and are resurrected upon convergence. C5 is added upon convergence. Also as shown in FIG. 6, if the resolution policy is update wins or delete wins, the results are the same, respectively, as remote wins and local wins.

FIG. 7 is another update-delete conflict between two replicas, replica A and replica B. Replica A comprises entity E1 and entity E2. Entity E1 comprises child entity C1. Replica B comprises the same entity hierarchies as replica A. Replica A moves entity C1 into E2's hierarchy and replica B deletes entity E2.

FIG. 8 is a table depicting various example resolution results of the scenario depicted FIG. 7. Two types of conflict resolution are depicted in FIG. 7. The resolution types include logging the conflict or resolving the conflict by undoing the moves. When replica A sends synchronization information to replica B (A➔B), the immediate result is that C1 exists under E1 and E2 is deleted. Upon convergence, E1 remains alive, E2 is deleted, and C1 exists under E1. If replica B sends synchronization information to replica A (B➔A), the immediate results are the E2 is resurrected and C1 exists under E2. Upon convergence, E1 and E2 are alive and C1 exists under E2. Although not depicted in FIG. 8, other conflict resolution policies described herein, such as local wins, remote wins, and most recent event wins, are applicable to the scenario type depicted in FIG. 7.

Another conflict resolution policy, referred to as "most recent event wins" or "last writer wins," resolves an update-delete conflict by converging the state of the replicas to be compatible with the most recent event. The update/delete times are compared and the most recent event wins. The latest delete time could be the time that an ancestor of entity was deleted. Thus if the time an entity in a first replica was update is later than the time the same entity in a second replica was deleted, the update will not win if there was a subsequent update to the entity's ancestor in a compound item in the second replica.

During resolution of an update-delete conflict, new versions of change units for deleted entities are assigned. The new version contains information about the previous version of the change unit. The previous version information is referred to as the "based on version." Further, when an entity is deleted, its tombstone contains a based on version. The based on version is useful to facilitate resurrection of a deleted entity. For example, if an update-delete conflict is being resolved on the updater side, the updated change units contain based on versions indicative of the previous update version. If an update-delete conflict is being resolved on the deleter side, the new tombstone version contains a based on version indicative of the version of the entity prior to deletion.

When an update-delete conflict is resolved in favor of the update on the updater side all entities in the compound item are resurrected. If the deletion is of a non-root compound item all entities belonging to the compound item and below the deleted item resurrected. When an update-delete conflict is resolved in favor of the update on the deleter side, the pending knowledge from the conflict is added to the replica. This facilitates use of this information to resolve subsequent conflicts. When logging an update-delete conflict, all knowledge generated during the conflict is logged. This too facilitates use of this knowledge to resolve subsequent conflicts.

FIG. 9 illustrates an example resolution of an update-delete conflict involving three replicas, replica A, replica B, and replica C. FIG. 9 depicts the synchronization events that occur, leading to convergence of the replicas. The first row (row 1) in FIG. 9 shows replica A, replica B, and replica C being in synch. The knowledge for three change units of an entity is depicted. A10 indicates that in replica A, the most recent version of a change unit in an entity corresponds to a counter value 10. B15 indicates that in replica B, the most recent version of another change unit, in the same entity, corresponds to counter value 15. C20 indicates that in replica C, the most recent version of another change unit, in the same entity, corresponds to counter value 20. The counter values keep track of changes to a specific change unit. In an example embodiment, the counter value for a change unit version is incremented each time another version of the change unit is generated.

As depicted in row 2, replica A updates a change unit resulting in the new version being indicated as A11. This is depicted as CU:A11. Replica B deletes a change unit resulting in the new version being indicated as B16. This is depicted by DV:B16. Replica A sends synchronization information to replica B, depicted as A➔B between rows 2 and 3. Row 3 depicts the knowledge in the replicas after A➔B. Replica A and replica C have the same knowledge as prior to A➔B. Replica B, which is applying the synchronization operation has received knowledge indicating that a change has occurred in replica A on the same entity that has experienced a deletion in replica B. Thus an update-delete conflict exists. The resolution policy for the illustration of FIG. 9 is that the update wins. Replica B updates it change unit version A11 to A11, and updates the change unit version B16 to B17. B17 is based on the previous version of the change unit, B16. This is depicted by B17:(BOV:B16). Also, B17 is marked for resurrection. This is depicted by the asterisk next to B17. A version can be marked for resurrection by any appropriate means, such as by setting a flag for example. B17 is marked for resurrection to be resurrected to the based on version (which is B16 in this example).

In a subsequent synchronization operation, replica B sends synchronization information to replica A as shown by A◀B between rows 3 and 4. The knowledge in replica A at row 4 shows that B15 has been updated to B17, which is based on version B16. B17 is not marked for resurrection because the change unit was not deleted in replica A. Also, at row 4, replica A is depicted having the knowledge that the latest version of the change unit is A 12, which is based on version A11). Replica A sends synchronization information to replica B, as depicted by A➔B between rows 4 and 5, and row 5 depicts that knowledge in the replicas thereafter. Replica B now shows that A12 is the latest version of the change unit, and that the latest version is based on A11. Based on versions remain assigned to new versions. Also, the deleted change unit has been resurrected and is now version B17, which is based on version B16. B17 is no longer marked for resurrection because the change unit has been resurrected. Finally, replica B sends synchronization information to replica C, as depicted by A➔B between rows 5 and 6. Row 6 shows that all replicas are synchronized because the versions of the change units are the same for each replica. Thus, the synchronization process has converged.

The following flow diagrams depict various example processes for resolving update-delete conflicts. Generally, to detect a conflict, the versions of a remote change are checked with respect to the local knowledge. If the change is obsolete it is disregarded. If the remote change is a tombstone marked for resurrection and the local entity is alive, all change unit versions are updated and the prior change update version (CUV) is set as the based on version for each change unit. If the remote change is a tombstone marked for resurrection and the local entity is a tombstone that is not marked for resurrection, the remote change is applied. If the remote change is a tombstone marked for resurrection and the local entity is a tombstone marked for resurrection, this is an indication that two different replicas are marking the same entity for resurrection, one of the versions is deterministically picked as the winner, and the change associated with the winner is kept. In an example embodiment, the replica having the smallest replica ID is chosen as the winner.

An update-delete conflict also is detected if the remote change is alive, the local entity is a tombstone not marked for resurrection, and the local tombstone's deletion version is not know to the sender. If the remote change is alive and the local entity is a tombstone, one of the following is true. The local tombstone's deleted version is known to the sender, all local tombstones based on deletion versions are know to sender, or the local tombstone is marked for resurrection. If the remote change includes all change units, the entity is resurrected.

If a remote change is a tombstone, the tombstone's deletion version is not known, the tombstone's is not marked for resurrection, the tombstone is no based on deletion versions, or at least one of its based on deletion versions is not known, the following four scenarios could arise. If the local entity is alive and at least one change unit version is not known to the sender, an update-delete conflict is reported. If the local entity is alive and at least one change unit version is not known to sender, an update-delete conflict is reported. If the local entity is a tombstone, the tombstone's deletion version is not known to the sender, and the tombstone is marked for resurrection, the remote change is disregarded. If the local entity is a tombstone, the tombstone's deletion version is not known to the sender, and the tombstone is not marked for resurrection, one of the versions is deterministically picked as the winner, and the change associated with the winner is kept. In an example embodiment, the replica having the smallest replica ID is chosen as the winner. If a local entity is a tombstone and its deletion version is known to sender, or all of its based on deletion versions are known to sender, the change is applied.

If the remote change is a tombstone, the tombstone's deletion version is not known, the tombstone is not marked for resurrection, and all of the tombstone's based on deletion versions are known, the following for scenarios can arise. If the local entity is alive, the remote change is disregarded. If the local entity is a tombstone and its deletion version is known to sender, the remote change is applied. If the local entity is a tombstone, the tombstone's deletion version is not known to the sender, and the tombstone is marked for resurrection, the local change is kept and it is assigned a new deletion version setting based on deletion versions to the prior deletion version. Keep the marked for resurrection set. If the local entity is a tombstone, the tombstone's deletion version is not known to the sender, the tombstone is not marked for resurrection, and all the tombstone's based on deletion versions are known to the sender, one of the versions is deterministically picked as the winner, and the change associated with the winner is kept. In an example embodiment, the replica having the smallest replica ID is chosen as the winner.

FIG. 10 is a flow diagram of an example process for resolving update-delete conflicts. An update to an entity in a replica is detected at step 12. A deletion to the same entity on a different replica is detected at step 14. The update and deletion are detected during the synchronization process between the replicas. It is determined that an update-delete conflict exists at step 16. For example, a processor or the like on which one of the replicas is located can receive indications of the deletion and the update and make the determination that the indications constitute an update-delete conflict. To resolve an update-delete conflict, the local replica receives either an indication that the deletion of an entity was erroneous (e.g., in the form of a mark to resurrect), or no indication that the deletion was erroneous, in which case the update will typically win.

The conflict is resolved in accordance with the conflict resolution policy in effect. If the conflict resolution policy comprises an update wins policy (step 18) the conflict is resolved in favor of the update at step 20. If the conflict resolution policy comprises a remote wins policy (step 18) the conflict is resolved in favor of the event (e.g., deletion or update) that took place in the remote replica at step 26. If the conflict resolution policy comprises a local wins policy (step 18) the conflict is resolved in favor of the event (e.g., deletion or update) that took place in the local replica at step 22. If the conflict resolution policy comprises a last writer wins policy (step 18) the conflict is resolved in favor of the most recent event (e.g., deletion or update) that took place at step 28. If the conflict resolution policy comprises a delete wins policy (step 18) the conflict is resolved in favor of the deletion at step 24.

Figure 11:
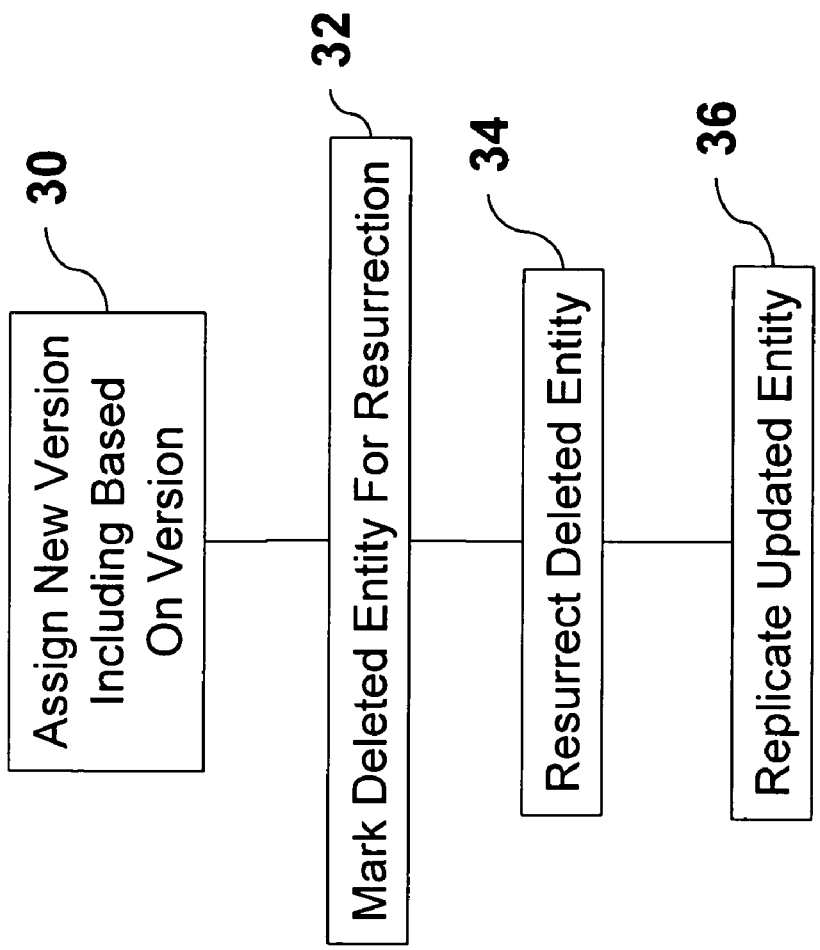
FIG. 11 is a flow diagram of an example process for resolving an update-delete conflict in favor of the update.

FIG. 11 is a flow diagram of an example process for resolving the conflict in favor of the update. At step 30, a new version of the change unit that was updated is assigned. The new version includes a based on version as described above. The deleted entity is marked for resurrection at step 32. The deleted entity is resurrected to the previous undeleted version at step 34. The updated entity is replicated on all replicas at step 36.

Figure 12:
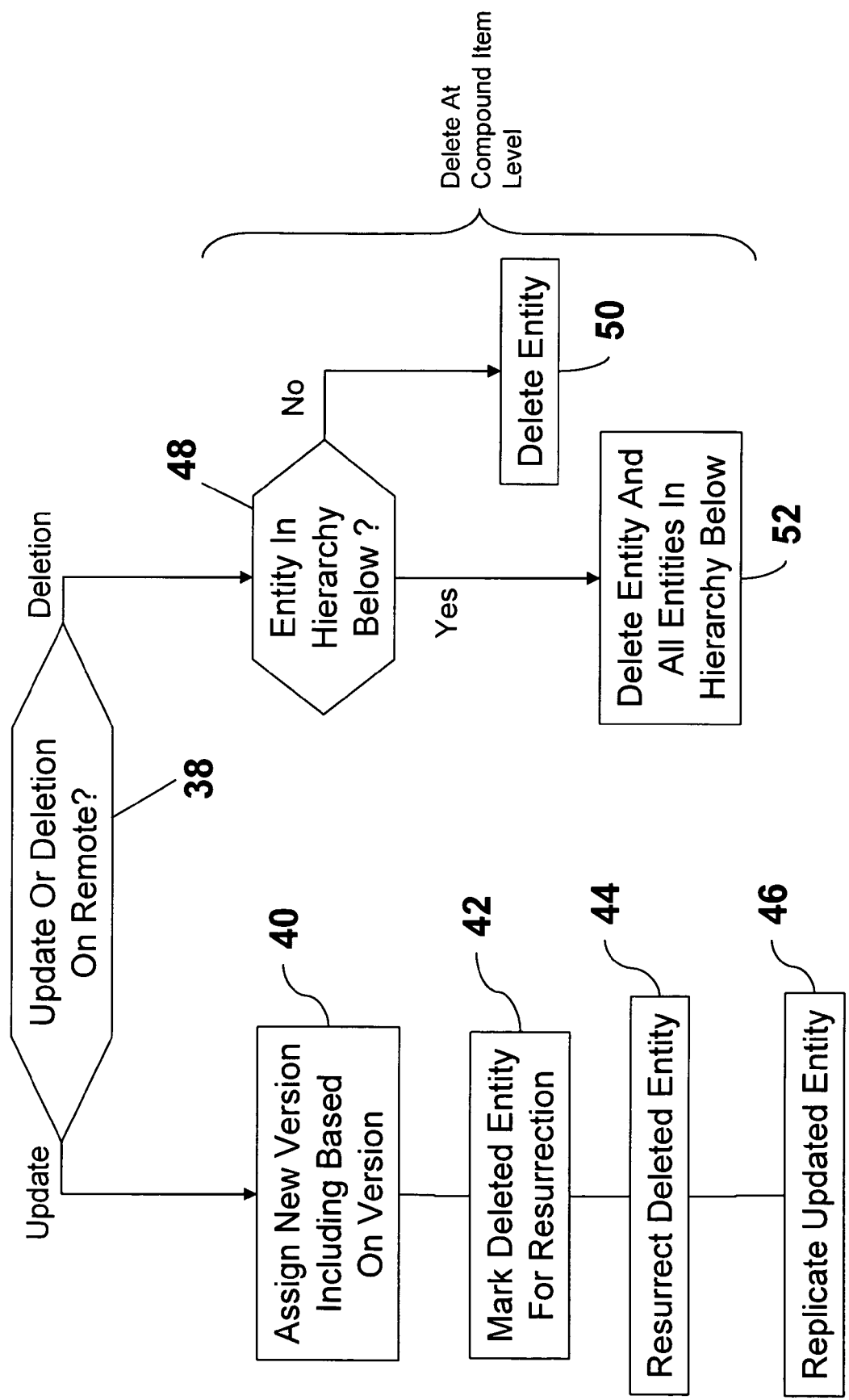
FIG. 12 is a flow diagram of an example process for resolving an update-delete conflict in favor of the remote replica.

FIG. 12 is a flow diagram of an example process for resolving the conflict in favor of the remote replica. It is determined, at step 38, if the event that occurred at the remote replica was a deletion or an update. If it is determined (step 38) that the event was an update, the change unit that was updated is assigned a new version at step 40. The new version includes a based on version as described above. The deleted entity is marked for resurrection at step 42. The deleted entity is resurrected to the previous undeleted version at step 44. The deleted entity is resurrected at the compound item level, if appropriate. That is, if any child entities were deleted, the child entities are resurrected. The updated entity is replicated on all replicas at step 46. If, at step 38, it is determined that the event that took place at the remote replica was a deletion, the entity is deleted at the compound item level. It is determined, at step 48, if the entity has any children entities in its hierarchy. If no children entities exist in the deleted entity's hierarchy (step 48), the entity is deleted at step 50. If children entities do exist in the entity's hierarchy, the entity and all its children entities are deleted at step 52.

Figure 13:
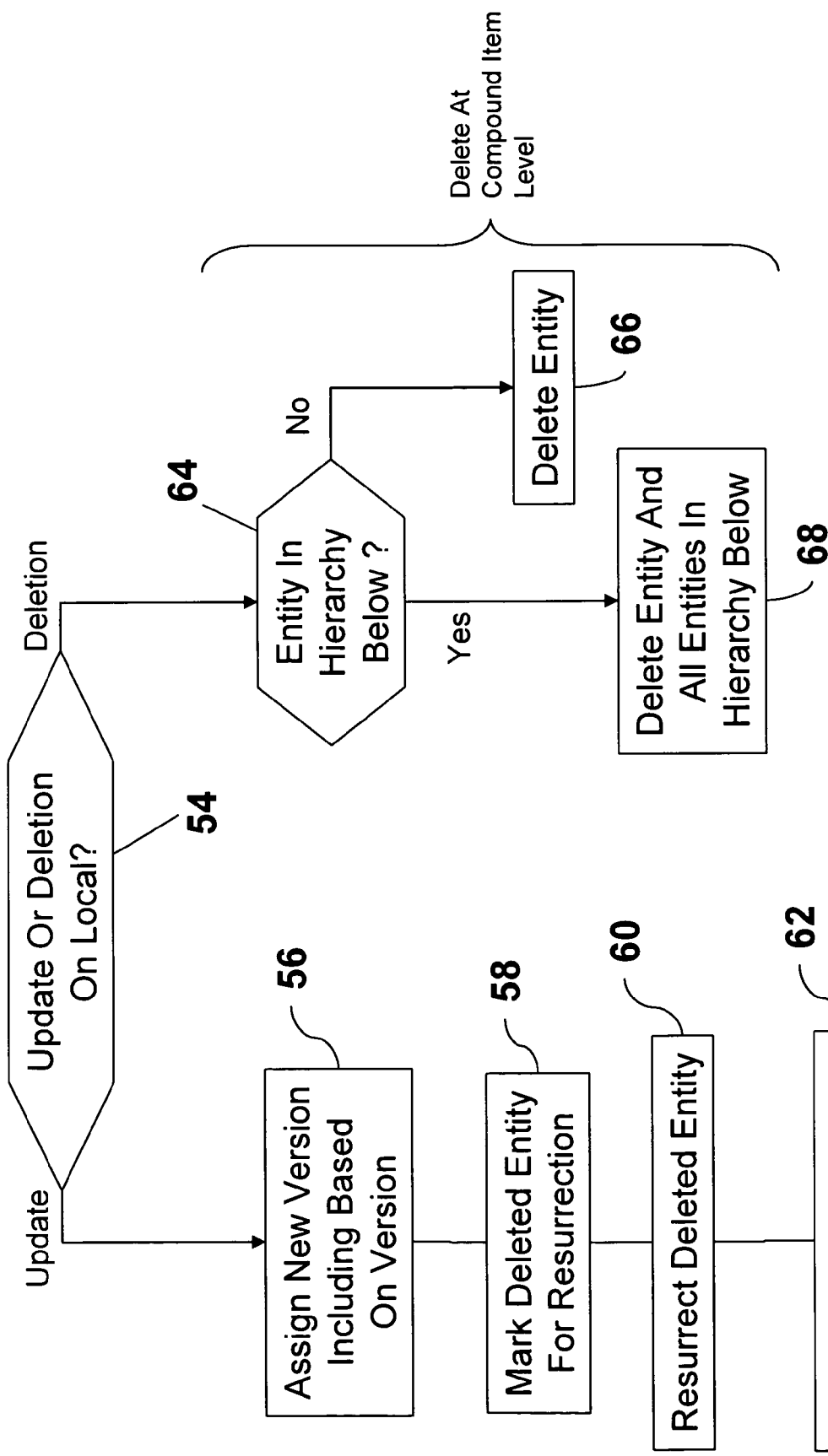
FIG. 13 is a flow diagram of an example process for resolving an update-delete conflict in favor of the local replica.

FIG. 13 is a flow diagram of an example process for resolving the conflict in favor of the local replica. The process depicted in FIG. 13 is similar to the process depicted in FIG. 12. It is determined, at step 54, if the event that occurred at the local replica was a deletion or an update. If it is determined (step 54) that the event was an update, the change unit that was updated is assigned a new version at step 56. The new version includes a based on version as described above. The deleted entity is marked for resurrection at step 58. The deleted entity is resurrected to the previous undeleted version at step 60. The deleted entity is resurrected at the compound item level, if appropriate. That is, if any child entities were deleted, the child entities are resurrected. The updated entity is replicated on all replicas at step 62. If, at step 54, it is determined that the event that took place at the local replica was a deletion, the entity is deleted at the compound item level. It is determined, at step 64, if the entity has any children entities in its hierarchy. If no children entities exist in the deleted entity's hierarchy (step 64), the entity is deleted at step 66. If children entities do exist in the entity's hierarchy, the entity and all its children entities are deleted at step 68.

Figure 14:
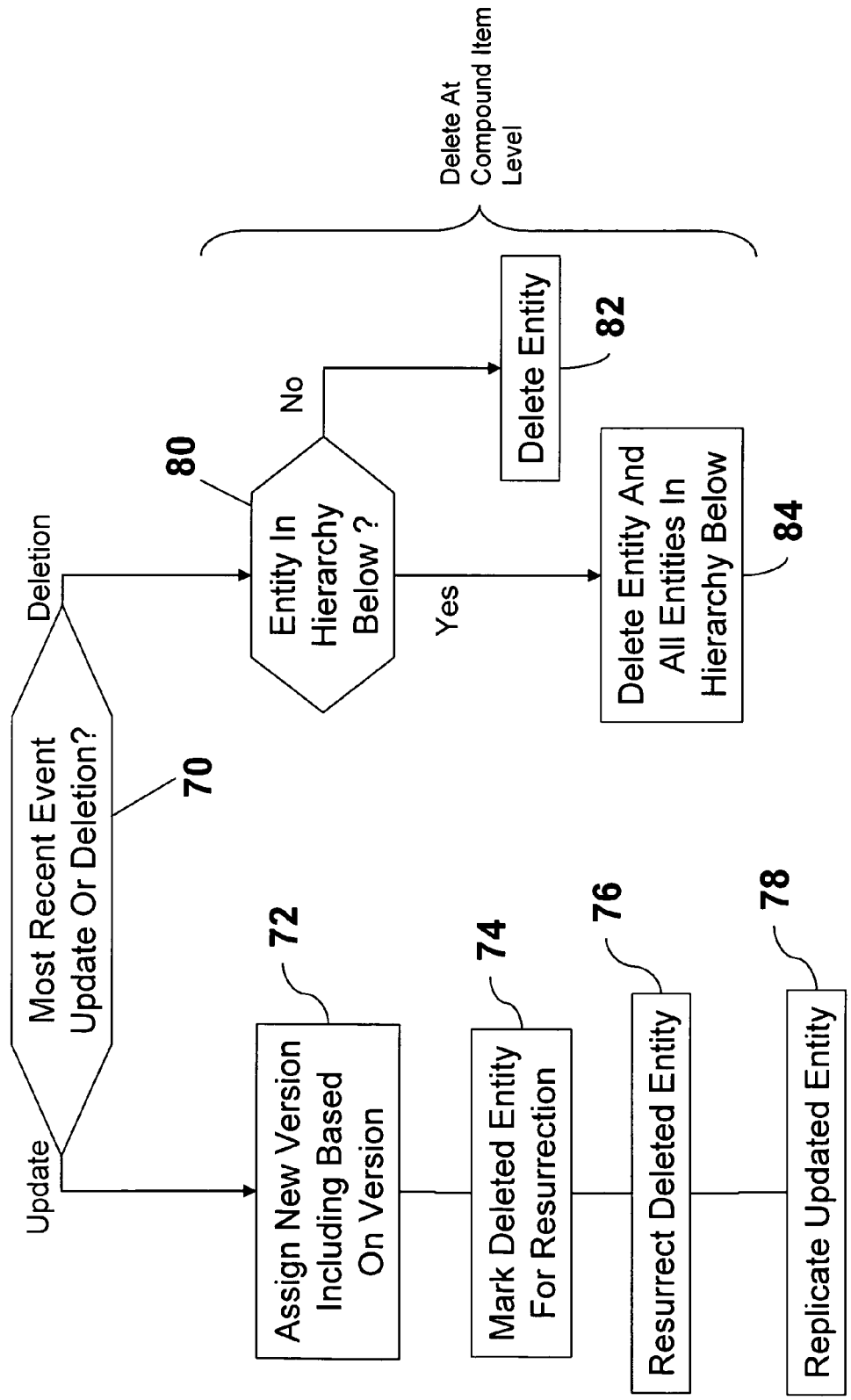
FIG. 14 is a flow diagram of an example process for resolving an update-delete conflict in favor of the most recent event.

FIG. 14 is a flow diagram of an example process for resolving the conflict in favor of the most recent event. The process depicted in FIG. 14 is similar to the process depicted in FIG. 12 and FIG. 13. At step 70, it is determined whether the update or the deletion occurred most recently. If it is determined (step 70) that the update occurred more recently than the deletion, the change unit that was updated is assigned a new version at step 72. The new version includes a based on version as described above. The deleted entity is marked for resurrection at step 74. The deleted entity is resurrected to the previous undeleted version at step 76. The deleted entity is resurrected at the compound item level, if appropriate. That is, if any child entities were deleted, the child entities are resurrected. The updated entity is replicated on all replicas at step 78. If, at step 70, it is determined that the deletion occurred more recently than the update, the entity is deleted at the compound item level. It is determined, at step 80, if the entity has any children entities in its hierarchy. If no children entities exist in the deleted entity's hierarchy (step 80), the entity is deleted at step 82. If children entities do exist in the entity's hierarchy, the entity and all its children entities are deleted at step 84.

Figure 15:
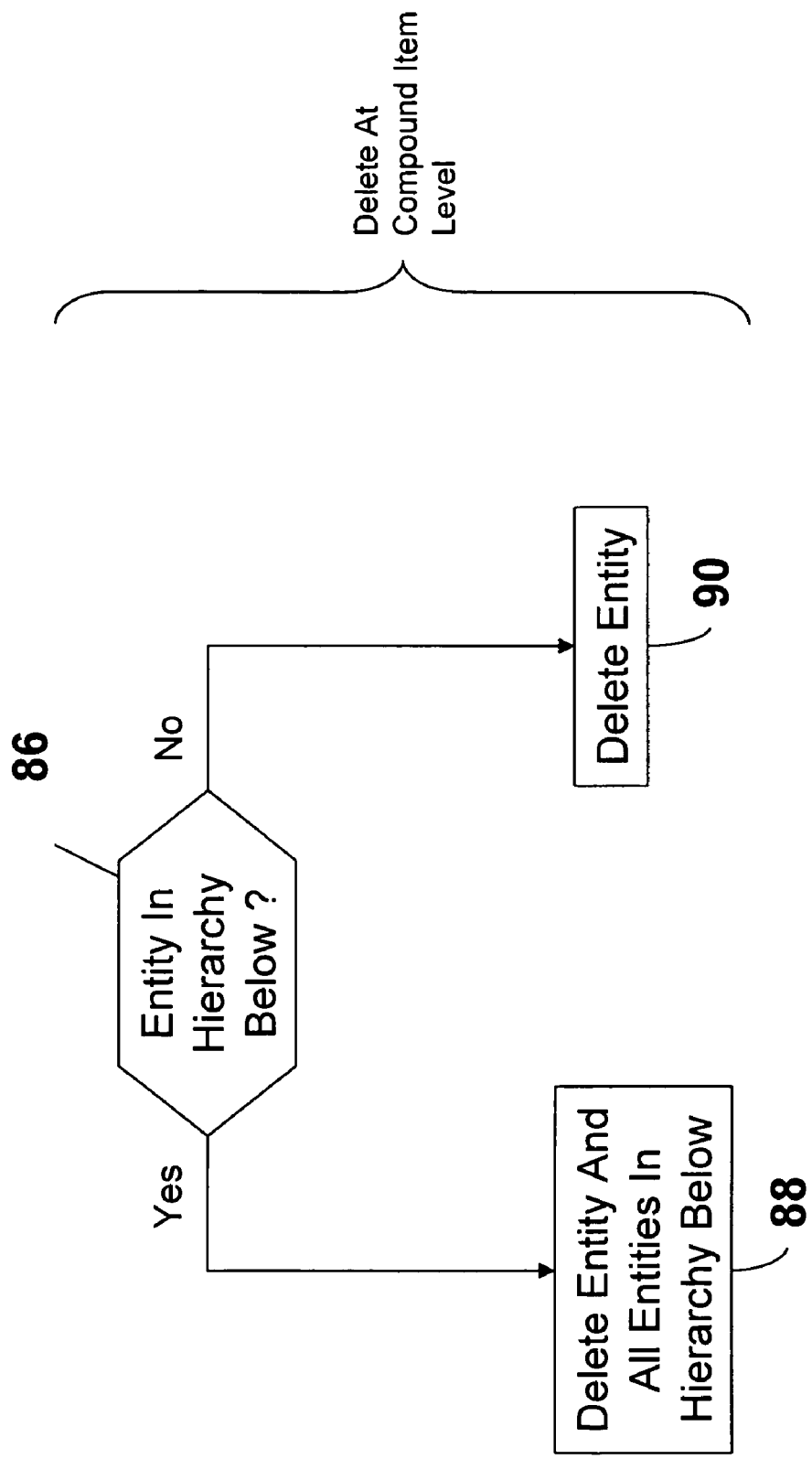
FIG. 15 is a flow diagram of an example process for resolving an update-delete conflict in favor of the deletion.

FIG. 15 is a flow diagram of an example process for resolving the conflict in favor of the deletion. The entity is deleted at the compound item level. It is determined, at step 86, if the entity has any children entities in its hierarchy. If no children entities exist in the deleted entity's hierarchy (step 86), the entity is deleted at step 90. If children entities do exist in the entity's hierarchy, the entity and all its children entities are deleted at step 88.

Figure 16:
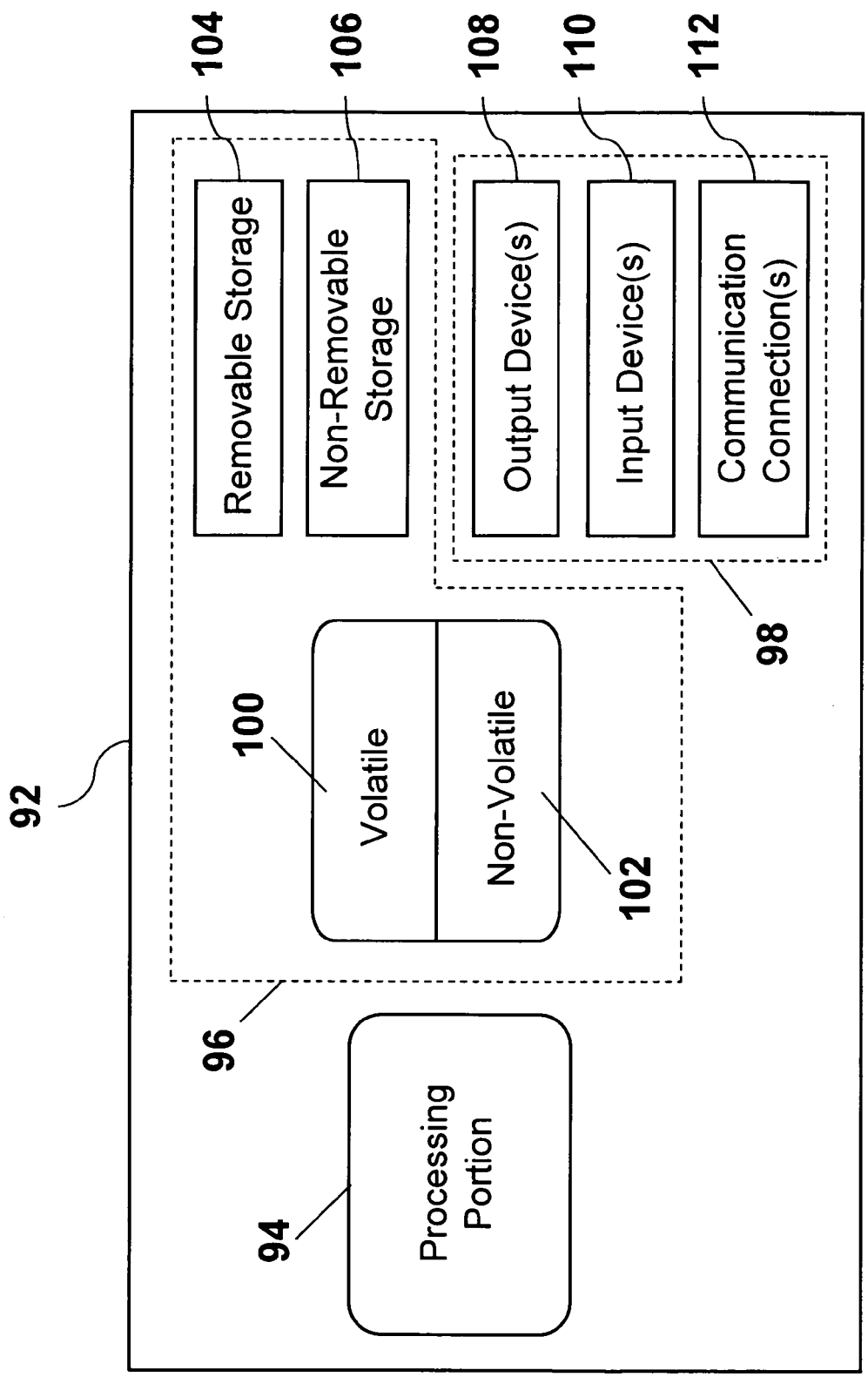
FIG. 16 is a diagram of an exemplary computing device for resolving update-delete conflicts.

FIG. 16 is a diagram of an exemplary computing device 92 for resolving update-delete conflicts. The computing device 92 can be implemented as a client processor and/or a server processor. For example, each replica being synchronized can reside on a respective computing device 92. In another example, multiple replicas can reside on a computing dive 92. The computing device 92 comprises a processing portion 110, a memory portion 112, and an input/output portion 98. The processing portion 94, memory portion 96, and input/output portion 98 are coupled together (coupling not shown in FIG. 16) to allow communications therebetween. The computing device 92 is capable of performing the operations associated with resolving update-delete conflicts. For example, the processing portion 94 is capable of providing the ability to choose between deleting the entity from the selected replicas or replicating the updated entity on the selected replicas, as described above. The memory portion 96 is capable of storing all parameters associated with resolving update-delete conflicts, such as information (e.g., knowledge), pertaining to updated and deleted entities, for example. In an example embodiment, the memory portion 96 stores at least one replica.

Input/output portion 98 is capable of providing and/or receiving components, as describe above, utilized to resolve update-delete conflicts. The input/output portion 98 can provide data to and receive data from another computing device, a storage device, a replica, and/or a data stream. The input/output portion 98 is capable of receiving and/or providing an indication that an entity was deleted and that an entity was updated.

Depending upon the exact configuration and type of processor, the memory portion 96 can be volatile (such as RAM and/or cache) 100, non-volatile (such as ROM, flash memory, etc.) 102, or a combination thereof. The computing device 92 can have additional features/functionality. For example, the computing device 92 can include additional storage (removable storage 104 and/or non-removable storage 106) including, but not limited to, magnetic or optical disks, tape, flash, smart cards or a combination thereof. Computer storage media, such as memory portion 96, 100, 102, 104, and 106, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the computing device 92. Any such computer storage media can be part of the computing device 92.

The computing device 92 also can contain communications connection(s) 112 that allow the computing device 92 to communicate with other devices. Communications connection(s) 112 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. The term computer readable media as used herein includes both storage media and communication media. The computing device 92 also can have input device(s) 110 such as keyboard, mouse, pen, voice input device, touch input device, etc. Output device(s) 108 such as a display, speakers, printer, etc. also can be included.

While it is envisioned that numerous embodiments of resolving update-delete conflicts are particularly well-suited for computerized systems, nothing in this document is intended to limit the scope thereof. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for resolving update-delete conflicts, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for resolving update-delete conflicts.

The program(s) can be implemented in assembly or machine language, if desired. In any case, the language can be a compiled or interpreted language, and combined with hardware implementations. The methods and apparatuses for resolving update-delete conflicts also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for resolving update-delete conflicts. When implemented on a general-purpose processor, the program code combines with the processor to provide a unique apparatus that operates to invoke the functionality of resolving update-delete conflicts. Additionally, any storage techniques used in connection with resolving update-delete conflicts can invariably be a combination of hardware and software.

While resolving update-delete conflicts has been described in connection with the example embodiments of the various figures, it is to be understood that other similar embodiments can be used or modifications and additions can be made to the described embodiments for performing the same functions for resolving update-delete conflicts without deviating therefrom. Therefore, resolving update-delete conflicts as described herein should not be limited to any single embodiment, but rather should be construed in breadth and scope in accordance with the appended claims.

What is claimed:

1. A method for resolving conflicts, the method comprising:
   receiving an indication that an entity in a first replica was updated;
   receiving an indication that the entity in a second replica was deleted;
   receiving one of:
      an indication that the deletion of the entity was erroneous; and
      no indication that the deletion of the entity was erroneous;
   if no indication is received that the deletion of the entity was erroneous, deleting the entity from the first replica and the second replica;
   if an indication is received that the deletion of the entity was erroneous:
      resurrecting the entity in the second replica;
      requesting from the first replica the updated entity;
      replicating the updated entity in the first replica and the second replica;
   performing one of the steps of replicating and deleting in accordance with a conflict resolution policy;

if the conflict resolution policy comprises resolving a conflict in favor of an update, performing the step of replicating;
if the conflict resolution policy comprises resolving a conflict in favor of a deletion;
performing the step of deleting;
if the conflict resolution policy comprises resolving a conflict in favor of a remote replica:
    performing the step of deleting, if the first replica comprises the remote replica; and
    performing the step of replicating, if the second replica comprises the remote replica;
if the conflict resolution policy comprises resolving a conflict in favor of a local replica:
    performing the step of deleting, if the first replica comprises the local replica; and
    performing the step of replicating, if the second replica comprises the local replica; and
if the conflict resolution policy comprises resolving a conflict in accordance with a most recent occurrence of the update or the deletion:
    performing the step of deleting, if the deletion occurred more recently than the updated; and
    performing the step of replicating, if the update occurred more recently than the deletion.

2. A method in accordance with claim 1, wherein deleting comprises deleting all child entities in a hierarchy to which the deleted entity belongs.

3. A method in accordance with claim 1, wherein replicating the updated entity comprises replicating all child entities in a hierarchy to which the entity belongs.

4. A method in accordance with claim 1, wherein replicating further comprises:
    assigning a new change version to the deleted entity, wherein the new change version is based on the updated entity and comprises an indicator marking the deleted entity for resurrection; and
    resurrecting the deleted entity to the updated entity.

5. A method in accordance with claim 1, further comprising:
    determining if at least one child entity in a hierarchy to which the deleted entity belonged was deleted; and
    if the at least one child entity was deleted, resurrecting the at least one child entity.

6. A method in accordance with claim 1, wherein the step of deleting further comprises:
    determining if the deleted entity had at least one child entity in a hierarchy to which the deleted entity belonged; and
    if the deleted entity had at least one child entity, deleting the entity and the at least one child entity.

7. A method in accordance with claim 1, wherein:
    the update to the entity on the first replica comprises moving the entity from a first hierarchy to a second hierarchy in the first replica;
    the deletion to the entity in the second replica comprises deletion the second hierarchy in the second replica;
    replicating further comprises replicating the entity in the second hierarchy in the first replica and the second replica; and
    deleting further comprises deleting the second hierarchy from the first replica and the second replica.

8. A system for resolving conflicts, the system comprising:
an input/output portion for:
    receiving an indication that an entity in a first replica was updated;
    receiving an indication that the entity in a second replica was deleted;
    receiving an indication that a deletion of an entity was erroneous; and
    receiving no indication that the deletion of the entity was erroneous;
a processing portion for:
    if no indication is received that the deletion of the entity was erroneous, deleting the entity from the first replica and the second replica;
    if an indication is received that the deletion of the entity was erroneous:
        resurrecting the entity in the second replica;
        requesting from the first replica the updated entity; and
        replicating the updated entity in the first replica and the second replica; and
    performing one of replicating and deleting in accordance with a conflict resolution policy;
    if the conflict resolution policy comprises resolving a conflict in favor of an update, performing the step of replicating;
    if the conflict resolution policy comprises resolving a conflict in favor of a deletion; performing the step of deleting;
    if the conflict resolution policy comprises resolving a conflict in favor of a remote replica:
        performing the step of deleting if the first replica comprises the remote replica; and
        performing the step of replicating, if the second replica comprises the remote replica;
    if the conflict resolution policy comprises resolving a conflict in favor of a local replica:
        performing the step of deleting, if the first replica comprises the local replica; and
        performing the step of replicating, if the second replica comprises the local replica; and
    if the conflict resolution policy comprises resolving a conflict in accordance with a most recent occurrence of the update or the deletion:
        performing the step of deleting, if the deletion occurred more recently than the update d; and
        performing the step of replicating, if the update occurred more recently than the deletion; and
a memory portion for storing information pertaining to updated and deleted entities.

9. A system in accordance with claim 8, the processing portion further for deleting all child entities in a hierarchy to which the deleted entity belongs.

10. A system in accordance with claim 8, the processing portion further for replicating the updated entity comprises replicating all child entities in a hierarchy to which the entity belongs.

11. A system in accordance with claim 8, to accomplish replication, the processing portion further for:
    assigning a new change version to the deleted entity, wherein the new change version is based on the updated entity and comprises an indicator marking the deleted entity for resurrection; and
    resurrecting the deleted entity to the updated entity.

12. A system in accordance with claim 8, the processing portion further for:
    determining if at least one child entity in a hierarchy to which the deleted entity belonged was deleted; and
    if the at least one child entity was deleted, resurrecting the at least one child entity.

13. A system in accordance with claim 8, to accomplish deletion, the processing portion further for:
   determining if the deleted entity had at least one child entity in a hierarchy to which the deleted entity belonged; and
   if the deleted entity had at least one child entity, deleting the entity and the at least one child entity.

14. A system in accordance with claim 8, wherein:
   the update to the entity on the first replica comprises moving the entity from a first hierarchy to a second hierarchy in the first replica;
   the deletion to the entity in the second replica comprises deletion the second hierarchy in the second replica;
   replicating further comprises replicating the entity in the second hierarchy in the first replica and the second replica; and
   deleting further comprises deleting the second hierarchy from the first replica and the second replica.

15. A computer-readable storage medium having computer-executable instructions thereon for resolving conflicts, the computer-executable instructions for performing the steps of:
   receiving an indication that an entity in a first replica was updated;
   receiving an indication that the entity in a second replica was deleted;
   receiving an indication that the deletion of the entity was erroneous;
   receiving no indication that the deletion of the entity was erroneous;
   if no indication is received that the deletion of the entity was erroneous, deleting the entity from the first replica and the second replica; and deleting all child entities in a hierarchy to which the deleted entity belongs; and
   if an indication is received that the deletion of the entity was erroneous, resurrecting the entity in the second replica and replicating the updated entity in the first replica and the second replica;
   performing one of the steps of replicating and deleting in accordance with a conflict resolution policy;
   if the conflict resolution policy comprises resolving a conflict in favor of an update, performing the step of replicating;
   if the conflict resolution policy comprises resolving a conflict in favor of a deletion; performing the step of deleting;
   if the conflict resolution policy comprises resolving a conflict in favor of a remote replica:
      performing the step of deleting, if the first replica comprises the remote replica; and
      performing the step of replicating, if the second replica comprises the remote replica;
   if the conflict resolution policy comprises resolving a conflict in favor of a local replica:
      performing the step of deleting if the first replica comprises the local replica; and
      performing the step of replicating, if the second replica comprises the local replica; and
   if the conflict resolution policy comprises resolving a conflict in accordance with a most recent occurrence of the update or the deletion:
      performing the step of deleting, if the deletion occurred more recently than the updated; and
   performing the step of replicating, if the update occurred more recently than the deletion.

16. A computer-readable storage medium in accordance with claim 15, wherein:
   the update to the entity on the first replica comprises moving the entity from a first hierarchy to a second hierarchy in the first replica;
   the deletion to the entity in the second replica comprises deletion the second hierarchy in the second replica;
   replicating further comprises replicating the entity in the second hierarchy in the first replica and the second replica; and
   deleting further comprises deleting the second hierarchy from the first replica and the second replica.

* * * * *